Frey & Marcardle.
Plumber's Wrench.
No. 102,390. Patented Apr. 26, 1870.
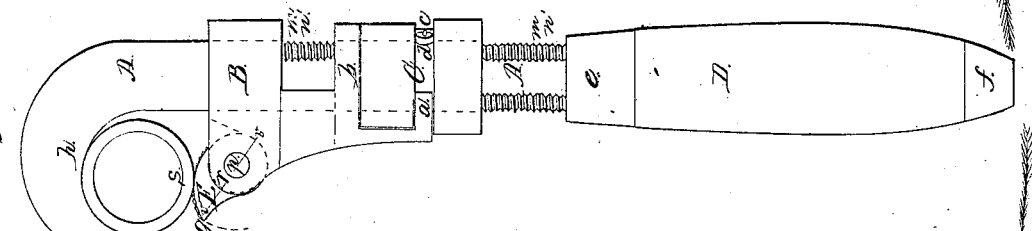
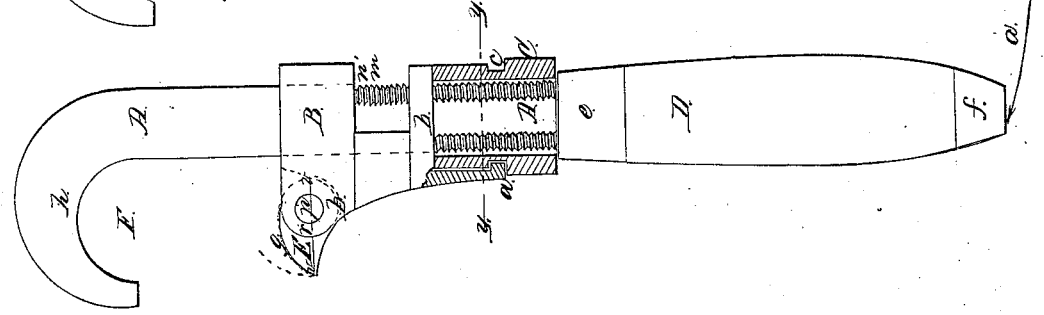
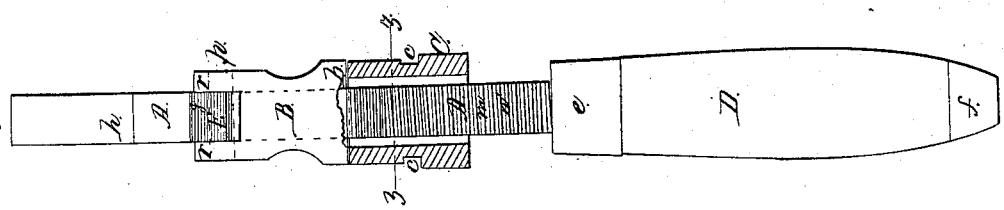
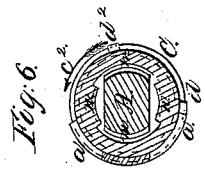
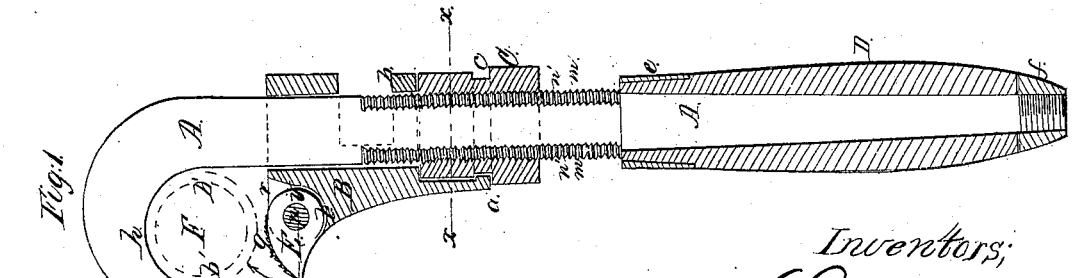
Witnesses:
S. W. Barawn
George Stout
Inventors:
Louis Frey
George Macardle
N. PETERS, PHOTO-LITHOGRAPHER, WASHINGTON, D. C.

United States Patent Office.

LOUIS FREY, OF NEWARK, NEW JERSEY, AND GEORGE MACARDLE, OF BROOKLYN, NEW YORK.

Letters Patent No. 102,390, dated April 26, 1870.

IMPROVEMENT IN PIPE AND BOLT-WRENCHES.

The Schedule referred to in these Letters Patent and making part of the same.

*To all whom it may concern:*

Be it known that we, LOUIS FREY, of Newark, in the county of Essex and State of New Jersey, and GEORGE MACARDLE, of Brooklyn, in the county of Kings and State of New York, have invented a new and useful Improvement in Pipe and Bolt-Wrenches; and we do hereby declare that the following is a full and exact description of our invention, reference being had to the accompanying drawings and to the letters of reference marked thereon, like letters referring to like parts.

Figure 1 is a longitudinal section;
Figure 2 is a front elevation with section of slip-nut;
Figure 3 is a side elevation with section of nut;
Figure 4 is a side elevation in position; and
Figures 5 and 6 are sections of the nut and shank through the lines represented by the letters $x\ x$, $z\ z$, and $y\ y$, respectively.

The nature of our invention consists in a sliding jaw, provided with a rocking or tilting-cam, having such a shape that the longest diameter shall be parallel to the opening of the hook portion of the shank, and with its under portion, forming a socket-joint with that portion of the sliding jaw to which it is attached, and having the said sliding jaw connected by a projection with an adjustable slip-nut.

To enable others skilled in the art to made and use our invention, we will proceed to describe its formation and operation.

In each of the figures represented by the accompanying drawings—

A A is the shank, having a hook-jaw, $h$, for receiving pipes or round bolts of various sizes, and having threads $m\ m$, or grooves $n'\ n'$ cut on its opposite sides, leaving the two other opposite sides with a plain surface, and secured to the wooden handle D by means of the nut $f$.

The sliding jaw B is so arranged that it will slide over the shank A A, as shown in figs. 3 and 6, at the will and convenience of the operator, and secured at any place on the shank A A at a greater or lesser distance from the hook-jaw $h$, as represented in fig. 1, by means of the adjustable slip-nut C, seen in all the figures.

This sliding jaw is provided with a cam, E, so constructed or shaped that the greater diameter represented by the red plain line $v\ v$ shall be parallel to the opening F of the hook-jaw $h$ of the shank A A, and having the greatest surface of the greatest circle or curve $g$ above the line of the longest diameter $v\ v$ of the cam.

This cam E is secured to the ears $r\ r$ of the sliding jaw B by means of the pin $p$, which passes through that portion of the cam on the long diameter that will cause the curve surface portion $g$ to raise when turned in the direction of the arrow $t$, thereby contracting the space between the hook-jaw $h$ and the convex surface of the cam, causing it to pinch or bite the pipe or round bolt which is placed between them, as shown in fig. 4.

This cam rocks on the recess made in the sliding jaw at $l$, fig. 1, so as to sustain the pressure that will bear on it, forming a socket joint instead of being supported by the pin $h$.

Now, the sliding jaw is held in its place, as represented by figs. 1, 2, 4, and 5, while the cam is pinching the bolt or pipe, as shown in fig. 4, by means of the adjustable slip-nut C, which is placed under the collar $b$, and kept there by the yoke $a$, which works in the groove $c$.

The peculiar arrangement and form of the interior of the adjustable slip-nut C makes it of great convenience in its adjustments, either in widening or contracting the space between the surface of the cam E and hook-jaw of the shank.

It can be seen in the figs. 1, 5, and 6, that this slip-nut C is provided with projecting threads on its opposite quarters of the interior circle, as shown at $n\ n$, corresponding with the grooves $n'\ n'$ cut of the opposite side of the shank A A, and which mesh together, as shown in figs. 1 and 5, and hold the sliding jaw B secure in the position in which it is placed. Should there be a space between the cam F and the bolt or pipe equal to the pitch of the thread, or even two threads, the peculiar arrangement of the cam, as heretofore described, will take up that space, and pinch the bolt or pipe when the wrench is turned toward the direction indicated by the large red arrow $a$, in fig. 4, the cam taking the position as is represented in this figure.

When it is desired to loosen the grasp of the cam, the wrench is turned in the direction indicated by the large red arrow $a^2$; this will cause the cam to move toward the position it is shown in fig. 1, thereby widening the space between it and the pipe or bolt, and giving freedom to redraw the wrench toward the direction of the large red arrow $a$, as before, and causing the pipe or bolt to turn with it as often as the operation may be desired by the operator.

Now, should it be desirous to operate with other sizes of pipe or bolts, whether larger or smaller than the one shown in fig. 4 of the drawings, the sliding jaw is very quickly and easily adjusted by turning the nut C only one-quarter of the way round in the direction indicated by the red arrow $c^1$, fig. 5, when the yoke $a\ a$ of the sliding jaw B, which works in the groove *c c* of the slip-nut, will come in contact with pin or stop *d*, as represented in fig. 6, causing the projecting threads *n n* of the slip-nut C to be thrown out of the groove *n' n'* in the shank A A, and clearing the plain surface of the side of the shank, taking the position, as shown in fig. 6; and the thread or groove portion of the shank will take the position in relation to the nut, as represented in fig. 3, which gives freedom to the nut, to move toward or from the hook-jaw *h*.

Fig. 3 represents the sliding jaw adjusted and free to move in an upward direction.

Now, when it is desirous to set the sliding jaw B up to a pipe or bolt, turn the slip-nut C so that the stop *d* will come in contact with the yoke *a*, as heretofore described; move it up to the bolt or pipe so the cam is close as possible to it, then turn the nut C in an opposite direction until the stop $d^2$ comes in contact with the yoke *a*, when the threads *n n* of the nut will enter the groove *n' n'* of the shank A A, which will secure the sliding jaw to the shank, and, by turning the wrench as before described, will cause the cam to bind on the pipe or bolt, and cause it to turn as desired; the above position of the nut C is shown in figs. 1 and 5.

The surface of the greatest curve *g* of the cam, is made with parallel teeth to cause it to bite on the surface of the pipe or bolt coming in contact with it, thereby preventing it from slipping.

The figs. 1 and 5 show the threads *n n* of the nut C meshed in the grooves *n' n'* of the shank A A, while fig. 2 shows the line of the plain surfaces of the shank and nut, also the space between them.

The same construction of the nut C, in combination with the shank A A, and sliding jaw B having a rigid plain-surface jaw, can be attached to a common nut wrench and operate in the same manner as herein described.

The great advantage gained in this pipe or round-bolt wrench is, the rapidity of adjustment, as well as the ease to various sizes of pipes or bolts; thereby saving time and labor, and the peculiar shape and hanging of the cam, which will contract the surface between its convex or upper curve surface and the hook-jaw of the shank, independent of adjusting the sliding jaw, thereby giving material advantage in numerous operations; this is a great peculiarity over wrenches of this class, and which will be readily appreciated by all who are accustomed to their use.

In fig. 1, the red dotted circular lines *b b'* represent the position of a pipe in the hook-jaw, and its relation to the cam E before the cam is brought to bear upon it, although the sliding jaw has been secured in a position to operate the pipe, and showing clearly that the raise of the cam must necessarily take up the space between the pipe and the cam, thereby pinching the pipe when turned, as before described in fig. 5, by large red arrow *a*.

We claim—

The adjustable slip-nut C, as herein described, in combination with the sliding jaw B, and rocking or tilting cam E, for the purpose as herein substantially set forth.

LOUIS FREY.
GEORGE MACARDLE.

Witnesses:
D. W. BALDWIN,
GEORGE STOUT.